(12) United States Patent
Brenneman et al.

(10) Patent No.: US 7,221,554 B2
(45) Date of Patent: May 22, 2007

(54) METHOD OF ELECTROLYTIC DEPOSITION OF AN INTRINSICALLY CONDUCTIVE POLYMER UPON A NON-CONDUCTIVE SUBSTRATE

(75) Inventors: Keith R. Brenneman, Simpsonville, SC (US); Keith L. Moore, Greenville, SC (US); Philip M. Lessner, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 191 days.

(21) Appl. No.: 11/037,973

(22) Filed: Jan. 18, 2005

(65) Prior Publication Data

US 2005/0164508 A1    Jul. 28, 2005

Related U.S. Application Data

(62) Division of application No. 10/442,568, filed on May 21, 2003.

(51) Int. Cl.
   *H01G 9/02*   (2006.01)
(52) U.S. Cl. ...................................... 361/525; 252/62.2
(58) Field of Classification Search ........ 361/525–527, 361/528–529; 252/62.2
   See application file for complete search history.

(56) References Cited

U.S. PATENT DOCUMENTS

| | | | |
|---|---|---|---|
| 4,697,000 A | 9/1987 | Witucki et al. | 528/423 |
| 4,803,596 A | 2/1989 | Hellwig et al. | 361/525 |
| 4,910,645 A | 3/1990 | Jonas et al. | 361/525 |
| 4,943,892 A | 7/1990 | Tsuchiya et al. | 361/525 |
| 5,236,627 A | 8/1993 | Hannecart et al. | 252/500 |
| 5,482,655 A | 1/1996 | Vogel et al. | 252/500 |
| 5,766,515 A | 6/1998 | Jonas et al. | 252/500 |
| 5,792,558 A | 8/1998 | Jonas et al. | 428/419 |
| 6,001,281 A | 12/1999 | Lessner et al. | 252/500 |
| 6,128,180 A | 10/2000 | Araki et al. | 361/525 |
| 6,151,205 A | 11/2000 | Kobayashi et al. | 361/523 |
| 6,219,223 B1 | 4/2001 | Kobayashi et al. | 361/525 |
| 6,229,689 B1 | 5/2001 | Kobayashi et al. | 361/525 |
| 6,344,966 B1 | 2/2002 | Monden et al. | 361/524 |
| 6,381,121 B1 | 4/2002 | Monden et al. | 361/525 |

*Primary Examiner*—Eric W. Thomas

(74) *Attorney, Agent, or Firm*—Joseph T. Guy; Nexsen Pruet, LLC

(57) ABSTRACT

A capacitor and method for manufacturing the capacitor. The capacitor comprises an anode; a dielectric oxide layer coated on the anode and a plurality of conductive islands coated on the dielectric oxide layer. An organic conductive cathode is coated on the dielectric layer and conductive islands.

9 Claims, 1 Drawing Sheet

METHOD OF ELECTROLYTIC DEPOSITION OF AN INTRINSICALLY CONDUCTIVE POLYMER UPON A NON-CONDUCTIVE SUBSTRATE

CROSS-REFERENCE TO RELATED APPLICATIONS

This application is a divisional application of U.S. patent application Ser. No. 10/442,568 filed May 21, 2003 which is pending.

BACKGROUND OF THE INVENTION

The present invention relates to an improved method of electrolytic deposition of a conductive polymer onto a non-conductive substrate. More specifically, the present invention relates to an aqueous solution comprising monomer and surfactants whereby a conductive polymer can be deposited on a non-conductive substrate efficiently without the necessity for a continuous seed layer.

Solid state electrolytic capacitors are well known in the art. The capacitors typically comprise an anode, or positive electrode, made from a porous valve-action metal. A solid electrolyte forms a cathode, or negative electrode. An oxide film, typically formed as the oxide of the anode, acts as a dielectric between the cathode and anode. Other components are typically included such as leads, encasement layers and the like.

Manganese dioxide has been employed in the past as a solid state conductor in capacitors for many years. The tendency of manganese dioxide to support ignition upon failure of the capacitor has led investigators to search for less powerful oxidizing agents which can be used as solid state conductors. This research has led to the widespread use of conductive polymers such as polypyrroles, polyanilines and polythiophenes.

Electrodeposition of a monomer onto an oxide surface, and electrolytic polymerization thereof has been difficult due, in part, to the inherent inability of an oxide layer to conduct. To overcome these problems it has been standard practice in the art to form a continuous seed layer of a suitable conductor, such as manganese dioxide, on the non-conductive oxide layer prior to electrodeposition of the intrinsically conductive polymer. A bothersome requirement for this process is the necessity for a continuous deposit of the manganese dioxide layer. Where voids exist in the manganese dioxide layer the electrodeposition is insufficient thereby resulting in poor coverage of polymer and failed capacitors. The desire to decrease manufacturing losses therefore led those skilled in the art to err on the side of a thicker manganese dioxide coating to avoid discontinuities in the seed layer. This increases both the amount of material required and the manufacturing complexity. The thicker manganese dioxide is a manufacturing necessity which does not enhance the product as viewed by the end user. It is therefore a desire to decrease the amount of the manganese dioxide seed layer without compromising the manufacturing yields or product performance. These desires have been contradictory prior to the present invention.

The present invention circumvents the problems in the art by providing a technique for electrodeposition whereby the conductive polymer can be adequately deposited on the surface of the dielectric and the electrodeposited conducted polymer can be deposited on a discontinuous seed layer. This advance greatly increases manufacturing efficiency by allowing lower seed layer loading on the surface of the dielectric.

BRIEF SUMMARY OF THE INVENTION

It is object of the present invention to provide a highly efficient method of forming a capacitor.

It is another object of the present invention to provide a method for electrodepositing conductive polymer onto a non-conductive layer comprising a discontinuous seed layer, such as manganese dioxide, deposited thereon.

A particular feature of the present invention is the ability to form a capacitor with less manganese dioxide on the surface of the dielectric thereby decreasing the material demand and the manufacturing difficulties associated with insuring deposition of a continuous layer of manganese dioxide or seed layer.

Another particular feature is the ability to utilize existing manufacturing systems with minor, or no, manufacturing modifications.

A particular feature of the present invention is the increased manufacturing yield which can be obtained by removing the need to dispose of those elements comprising discontinuous manganese dioxide layers. Prior to the present invention material with a discontinuous layer of manganese dioxide would be considered unsuitable whereas with the present invention they are suitable for use. With the present invention, an oxide layer comprising a discontinuous manganese dioxide layer is still properly coated with the conductive cathode layer.

A particular feature of the present invention is the ability to utilize essentially alcohol-free solvents for deposition of the conductive polymer without detrimental performance or loss in manufacturing efficiency. Alcohol reduction is an ongoing effort in all industries as is well known.

These and other advantages, as would be realised to one of ordinary skill in the art, are provided in a method for forming a capacitor. The method comprises forming an oxide layer on a valve metal. The oxide layer is contacted with a solution comprising a monomer precursor of the polymer of Formula I:

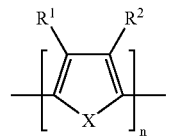

FORMULA I wherein:
X is S, Se or N;
$R^1$ and $R^2$ are not hydrogen;
and a compound of Formula II:

FORMULA II wherein $R^4$ is a $C_3$-$C_{20}$ linear or branched alkyl. The monomer is then polymerized.

Another embodiment is provided in a method for forming a capacitor. The method comprises forming a valve metal into a shape to form an anode. The anode is contacted with an oxidizing solution to form a dielectric layer on the anode. A discontinuous seed layer is formed on the dielectric layer to form a mixed oxide surface. The mixed oxide surface is contacted with an aqueous solution comprising a monomer precursor to the polymer of Formula 1 wherein $R^1$ and $R^2$ independently represent —$OR^3$ wherein $R^3$ represents hydrogen, linear or branched $C_1$-$C_{16}$ alkyl or $C_2$-$C_{18}$ alkoyxyalkyl; or are $C_3$-$C_8$ cycloalkyl, phenyl or benzyl which are unsubstituted or substituted by $C_1$-$C_6$ alkyl, $C_1$-$C_6$ alkoxy or halogen; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. The solution further comprises a compound of Formula II wherein $R^4$ is a $C_3$-$C_{20}$ linear or branched alkyl. The monomer is electrolytically depositing and polymerizing from the solution onto the mixed oxide surface.

Yet another embodiment is provided in a capacitor. The capacitor comprises an anode; a dielectric oxide layer coated on the anode and a plurality of conductive islands coated on the dielectric oxide layer. An organic conductive cathode is coated on the dielectric layer and conductive islands.

DETAILED DESCRIPTION OF THE INVENTION

Figure 1:
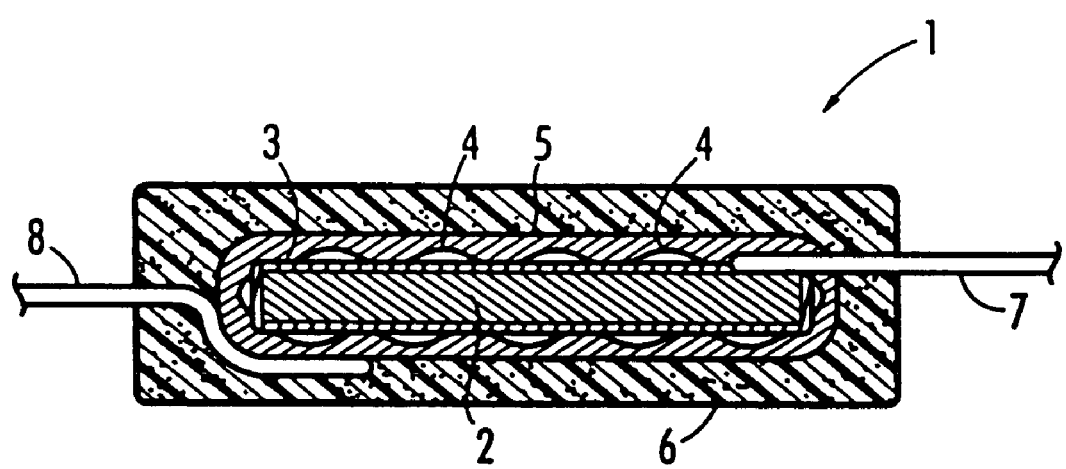
FIG. 1 is a cross-sectional view of a capacitor of the present invention.

The inventors of the present application have developed, through diligent research, a method of electrodeposition of a conductive polymer on a nonconductive layer comprising a discontinuous seed layer. The advantage is provided, in part, by the incorporation of organic sodium sulfate into the aqueous monomer solution of conductive polymer precursor. The organic sodium sulfate acts as a surfactant and dopant for the conductive polymer.

The invention will be described with reference to the FIG. 1 forming a part of the present application.

In FIG. 1, a cross-sectional view of a capacitor is shown as represented at 1. The capacitor comprises an anode, 2, comprising a valve metal as described herein. A dielectric layer, 3, is provided on the surface of the anode, 2. The dielectric layer is preferably formed as an oxide of the valve metal as further described herein. Coated on the surface of the dielectric layer 3, is a discontinuous conductive, or seed, layer, 4, preferably comprising manganese dioxide. As realized to one of skill in the art the seed layer facilitates electrodeposition and electropolymerization of the conducting layer, 5. Leads, 7 and 8, provide contact points for attaching the capacitor to a circuit. The entire element, except for the terminus of the leads, is then preferably encased in a housing, 6, which is preferably an epoxy resin housing.

The valve-metal is preferably niobium, aluminum, tantalum, titanium, zirconium, hafnium, or tungsten. Aluminum, tantalum and niobium are most preferred. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The valve metal in the form of a foil is preferably etched to increase the surface area. Etching is preferably done by immersing the valve metal into at least one etching bath. Various ethcing baths are taught in the art and the method used for etching the valve metal is not limiting herein.

The exterior of the valve metal is coated with a dielectric layer comprising an oxide. It is most desirable that the dielectric layer be an oxide of the valve metal. The oxide is preferably formed by dipping the valve metal into an electrolyte solution and applying a positive voltage to the valve metal.

Preferred electrolytes for formation of the oxide on the valve metal include aqueous solutions of dicarboxylic acids, such as ammonium adipate. Other materials may be incorporated into the oxide such as phosphates, citrates, etc. to impart thermal stability or chemical or hydration resistance to the oxide layer.

A discontinuous manganese dioxide layer is preferably deposited on the dielectric oxide layer and the conductive polymer layer is formed on the dielectric oxide film layer. The solid electrolyte is preferably obtained by immersing an anode element in an aqueous manganese nitrate solution. The manganese oxide is then formed by thermally decomposing the nitrate at a temperature of from 250° to 350° C. in a dry or steam atmosphere. The anode may be treated multiple times to insure optimum coverage. The manganese dioxide layer forms islands on the surface of the anode oxide. In prior art these islands were grown, and additional islands started, until the islands coalesced into a continuum of manganese dioxide. In the instant invention the growth and coalescence is no longer necessary. With non-continuous surface coatings the organic sulfate allows monomer to be deposited between the islands and electropolymerization is complete. In practice a seed layer covering 5% of the projected surface area has not been demonstrated to be sufficient for formation of a continuous polymeric layer. It is preferred that at least 1% of the projected surface area be covered with a seed layer, preferably manganese dioxide. There is no upper limitation to the amount of surface area above which the invention fails. In instances where a continuous manganese dioxide layer is present, the invention is operative even though this represents an inefficient use of manufacturing capability. It is preferred that no more than about 80% of the projected surface area be covered by a seed layer. More preferably no more than about 50% and most preferably no more than about 20% of the projected area is covered by a seed layer.

The conductive layer is formed by dipping the valve metal into an aqueous solution comprising monomer of the conductive polymer and an organic sulfate. The organic sulfate is believed to act as a dopant for facilitating conduction and as a surfactant. It is preferred that the solution be aqueous and most preferably the solution is substantially free of alcohol with less than about 1%, by weight, alcohol in the aqueous solution.

While not restricted to any theory, it is postulated that the organic sulfate provides a sufficient amount of solubilizing characteristic to the aqueous solution to maintain the monomer in solution. However, the solubilitization is not sufficient to overcome the desire to precipitate onto the non-conducting surface. This theory is difficult to test due to the occurrence of foam at higher surfactant levels wherein solubility could be sufficient to overcome the precipitation on the surface. While referred to herein as precipitation the result is a sufficient concentration of monomer at, and between, the islands of manganese dioxide to form a sufficient conducting trace for electropolymerization to occur. This may be aggregation at, or near, the surface or it may be a liquid solid interface with a concentration gradient of monomer therebetween with the organic sulfate acting as some type at bridge between the oxide surface and monomer, or between the manganese oxide layer and monomer, or between monomer units, or some combination of all of these. The mechanism has not been elucidated and is not limiting herein.

The conducting polymer is preferably the polymer of a monomer wherein the polymer comprises repeating units of Formula I:

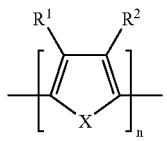

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—(CH$_2$)$_2$—O— is most preferred.

In Formula 1, X is S, Se or N most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-; or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The organic sulfate is defined by Formula II:

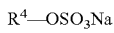

FORMULA II

In Formula II, $R^4$ is preferably a $C_3$-$C_{20}$ linear or branched alkyl. Below a $C_3$ alkyl the sulfate fails to act as a surfactant and the benefits are mitigated. Above about $C_{20}$ the solubility of the surfactant begins to diminish. More preferably $R^4$ is a linear alkyl of 6-20 carbons. Even more preferably $R^4$ is a linear alkyl of 10-14 carbons. Most preferably, $R^4$ is a linear alkyl of 12 carbons wherein the compound is sodium dodecyl sulfate also referred to as sodium lauryl sulfate.

The aqueous monomer solution preferably comprises about 2% by weight, monomer of Formula I to about 10% by weight, monomer of Formula I. Below about 2% by weight, monomer the chemical activity is diminished. Above about 10%, by weight monomer the solubility limit of monomer is approached thereby increasing the likelihood of premature precipitation and spoilage with minimal increased benefit. More preferable is a monomer concentration of about 4%, by weight, to about 5%, by weight.

The aqueous monomer solution preferably comprises about 4%, by weight, organic sulfate, to no more than about 17%, by weight, organic sulfate. Below about 4% surfactant the benefit is diminished. Above about 17% foam formation initiates which is highly undesirable. The addition of typical foam inhibitors, such as alcohol, is contrary to one desire and advantage provided by the invention. About 7.5%, by weight, organic sulfate, has been demonstrated in experiments to be an optional level with sufficient surfactant to form a continuous layer of polymer on a discontinuous seed layer while not approaching the formation of foam.

After contacting the anode with the monomer solution the monomer is polymerized by electrolytic polymerization. Polymerization is typically initiated at 1-10 volts and 0.01-10 microamps per square centimeter of surface area for 5-300 minutes.

The organic sulfate has the benefit of also acting as a dopant in the polymer. While not necessary, auxiliary dopants can be incorporated as typically employed in the art Specific examples of conducting salts, or auxiliary dopants, for the conductive polymer include but are not limited to acetates, $KHSO_4$, $Na_2SO_4$, $HCOOH$, $LiClO_4$, $HClO_4$, $NEt_4ClO_4$, $NBu_4ClO_4$, $KAlF_4$, $NaAlF_4$, $KBF_4$, $K_2ZrF_6$, $KAsF_6$, and $NaPF_6$. Electron acceptor dopants may be used such as $NO^+$ and $NO_2^+$ salts such as $NOBF_4$, $NOPF_4$, $NOSbF_6$, $NOAsF_6$, $NOCH_3SO_3$ $NO_2BF_4$, $NO_2PF_6$, $NO_2CF_3SO_3$. Suitable conducting salts include organic sulfonic acid ions such as aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto. The concentration of dopant, or conducting salt, is preferably determined such that for every 3 moles of starting monomer there is present not less than about 1 mole of conducting salt. The auxiliary dopant can be added in an amount up to about 30%.

Binders and cross-linkers can be incorporated into the conductive layer if desired. Suitable materials include poly (vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers. Water soluble binders such as polyvinyl alcohols are preferred. A solution comprising 0 to 30%, by weight binder is preferred.

Carbon paste layers and silver paste layers are formed for attaching electrode leads as known in the art. The device is then sealed in a housing.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

HYPOTHETICAL EXAMPLE

An aluminum anode can be formed and an aluminum oxide dielectric layer formed thereon as known in the art. The oxidized anode could be placed in a solution comprising manganese nitrate. The oxidized anode could then be heated to convert manganese nitrate to manganese dioxide. The amount of manganese dioxide would be sufficient to form islands covering approximately 5% of the projected surface area of the oxidized anode. The coated anode would then be placed in a solution comprising about 1-5%, by weight, 3,4-ethylenedioxythiophene, represented by Formula 1 when X is S and $R^1$ and $R^2$ are taken together to represent —O—$CH_2CH_2$—O—, and about 7.5%, by weight, sodium dodecyl sulfate represented by Formula II wherein $R^3$ is a $C_{12}$ straight chain alkyl. Leads and supplemental coatings can then be incorporated as well known in the art of capacitor manufacture. The capacitor would have excellent capacitance comparable to a prior art capacitor formed with a continuous manganese dioxide layer and an alcohol based solution.

COMPARATIVE EXAMPLE

A comparative example could be prepared in a manner analogous to the Hypothetical Example described above with the exception of pyrrole as the monomer. The resulting capacitor would most likely fail due to poor stability.

The invention has been described with particular emphasis on the preferred embodiments. It would be realized from the teachings herein that other embodiments, alterations, and configurations could be employed without departing from the scope of the invention which is more specifically set forth in the claims which are appended hereto.

The invention claimed is:

1. A capacitor formed by the method comprising:

forming an oxide layer on a valve metal;

contacting said oxide layer with a solution comprising a monomer precursor of the polymer of Formula I:

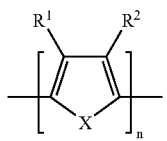

FORMULA 1 wherein:
X is S, Se or N;
$R^1$ and $R^2$ are not hydrogen;
and a compound of Formula II:

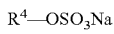

$R^4$—$OSO_3Na$         FORMULA II wherein $R^4$ is a $C_3$-$C_{20}$ linear or branched alkyl; and polymerizing said monomer.

2. A capacitor formed by the method of forming a valve metal into a shape to form an anode;
contacting said anode with an oxidizing solution to form a dielectric layer on said anode;
forming a discontinuous seed layer on said dielectric layer to form a mixed oxide surface;
contacting said mixed oxide surface with an aqueous solution comprising a monomer precursor to the polymer of Formula I:

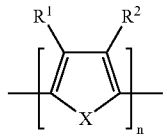

FORMULA 1 wherein $R^1$ and $R^2$ independently represent hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy or halogen; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements; and a compound of Formula II:

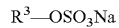

$R^3$—$OSO_3Na$         FORMULA II wherein $R^3$ is a $C_3$-$C_{20}$ linear or branched alkyl; and electrolytically depositing and polymerizing said monomer from said solution to said mixed oxide surface.

3. A capacitor comprising:
an anode;
a dielectric oxide layer coated on said anode;
a plurality of conductive islands coated on said dielectric oxide layer;
an organic conductive cathode coated on said dielectric layer and said conductive islands wherein said organic conductive cathode comprises a polymer formed by the electrolytic polymerization of:

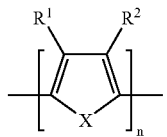

FORMULA 1 wherein:
X is S, Se or N wherein said $R^1$ and $R^2$ are taken together to form O—$CH_2CH_2$—O.

4. The capacitor of claim 3 wherein said organic conductor comprises a dopant.

5. The capacitor of claim 4 wherein said dopant is an organic sulfate.

6. The capacitor of claim 5 wherein said dopant is:

$R^4$—$OSO_3Na$ wherein $R^4$ is a $C_3$-$C_{20}$ linear or branched alkyl.

7. The capacitor of claim 3 wherein X is S.

8. The capacitor of claim 3 wherein said anode comprises a valve metal selected from a group consisting of niobium, aluminum, tantalum, titanium, zirconium, hafnium and tungsten.

9. The capacitor of claim 8 wherein said valve metal is selected from a group consisting of niobium, aluminum and tantalum.

* * * * *